United States Patent [19]

Endo et al.

[11] 4,033,011
[45] July 5, 1977

[54] VEHICLE FLOOR TRIMMING FASTENING ARRANGEMENT

[75] Inventors: Toshiaki Endo, Fujisawa; Toshiro Hatta, Yokohama, both of Japan

[73] Assignee: Nissan Motor Co., Ltd., Yokohama, Japan

[22] Filed: Nov. 26, 1975

[21] Appl. No.: 635,555

[30] Foreign Application Priority Data

Dec. 24, 1974 Japan .............................. 49-501800

[52] U.S. Cl. .................................... 24/73 FT; 16/4
[51] Int. Cl.[2] ......................................... A44B 21/00
[58] Field of Search ................... 24/73 FT; 16/4–16

[56] References Cited

UNITED STATES PATENTS

| 477,323 | 6/1892 | Childs | 16/4 |
|---|---|---|---|
| 728,767 | 5/1903 | Russell | 16/17 |

*Primary Examiner*—Werner H. Schroeder
*Assistant Examiner*—Doris L. Troutman
*Attorney, Agent, or Firm*—Frank J. Jordan

[57] ABSTRACT

A vehicle floor panel is provided, on the surface thereof, with an elongated rigid member formed with an inverted U-shaped opening forming a lug portion. A generally U-shaped hook member pivotally connected to the back of a floor trimming is engageable with the lug portion for fastening the floor trimming to the vehicle floor panel.

5 Claims, 5 Drawing Figures

VEHICLE FLOOR TRIMMING FASTENING ARRANGEMENT

The present invention relates to an arrangement for fastening a floor trimming such as a floor carpet or a floor mat to a vehicle floor panel.

It is an object of the present invention to provide an improved fastening arrangement which can readily and firmly fasten a floor trimming to a vehicle floor panel.

Another object of the present invention is to provide an arrangement which has a reduced number of parts and a simple inexpensive construction.

Other objects and advantages of the present invention will be made apparent as this description proceeds, particularly when considered in connection with the accompanying drawings, in which.

Figure 1:
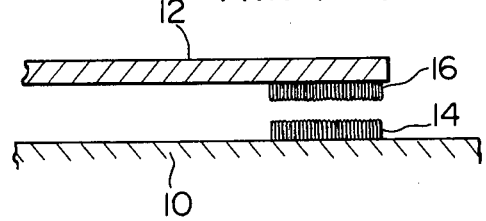
FIGS. 1 to 3 show respectively schematic sectional views of complete prior art arrangements for fastening the floor trimmings onto the vehicle floor panel.

Referring now to FIG. 1, there is shown a first prior art fastening arrangement which is incorporated with a vehicle floor panel 10 and a floor trimming 12. The elements used in this arrangement are the so called "hook and eye" contact adhesive members as well known to those skilled in the art. The adhesive members consist of an eye member portion 14 secured to the vehicle floor panel 10, and a hook member portion 16 secured to a suitable portion of the floor trimming 12. When it is required to set the floor trimming 12 on the vehicle floor panel 10, the surfaces of these members 14 and 16 are engaged with each other.

Although the above-stated prior art arrangement can provide easy installation of the floor trimming 12, the fastening between the hook and eye members 16 and 14 is quite low. Accordingly, disengagement between the members 14 and 16 may occur when the floor trimming 12 is scuffed by the vehicle passengers.

Figure 2:
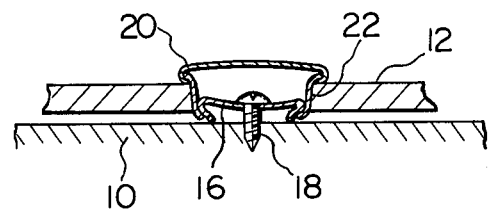

FIG. 2 shows a second prior art fastening arrangement which has a male member 16 connected to the vehicle floor panel 10 by means of a self tapping screw 18, and a female member 20 firmly coupled into a hole 22 formed in a suitable portion of the floor trimming 12. The female member 20 is snapped onto the male member 16 when fastening of the floor trimming 12 to the vehicle floor panel 10 is required.

Figure 3:
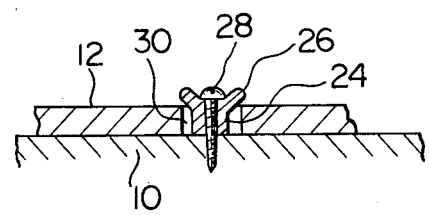

FIG. 3 shows a third prior art fastening arrangement which comprises a cylindrical stopper member 24 having an enlarged projection 26 on the top portion thereof and connected to the vehicle floor panel 10 by means of a self-tapping screw 28. The fastening of the floor trimming 12 onto the vehicle floor panel 10 is accomplished when the cylindrical stopper member 24 is disposed in a hole formed at a suitable portion of the floor trimming 12 and then fastened to the vehicle floor panel 10 by means of the screw 28.

In the second and third prior art arrangements, however, a great difficulty is experienced in assembling and/or disassembling the members, especially when the floor trimming 12 is wet. Further, in these arrangements, the projected female member 20 and the enlarged projection 26 of the cylindrical stopper member 24 will not only defile the appearance of the vehicle cabin but may also cause the vehicle passengers to slip or trip.

Accordingly, the present invention is provided for overcoming the above-mentioned drawbacks and demerits of the prior art fastening arrangements between the floor trimming and the vehicle floor panel.

Figure 4:
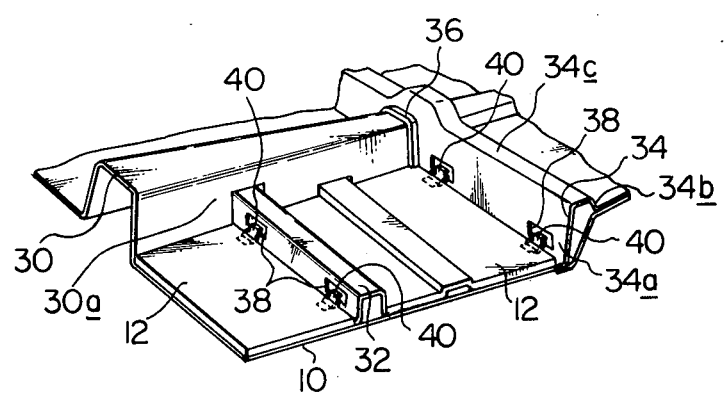
FIG. 4 is a partial perspective of a vehicle floor panel incorporated with elements of the arrangement according to the present invention.
Figure 5:
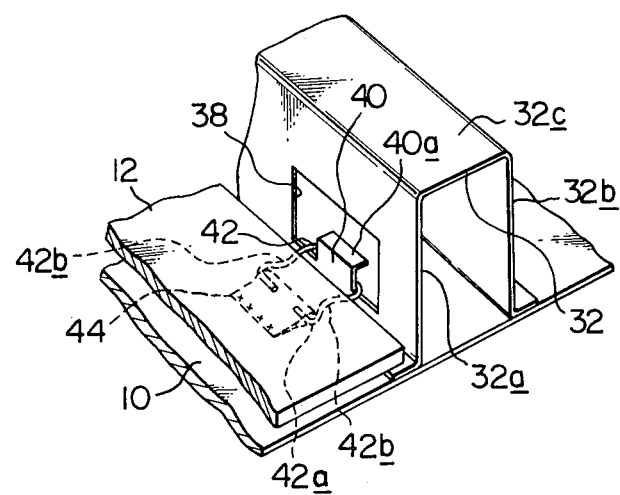
FIG. 5 is a fragmentary perspective view, on an enlarged scale, of a portion of the elements in FIG. 4.

Referring to FIGS. 4 and 5, a fastening arrangement according to the present invention is illustrated, which is arranged on the vehicle floor panel 10 having a longitudinally arranged transmission tunnel 30. The fastening arrangement comprises first and second elongated rigid members 32 and 34 provided on the surface of the vehicle floor panel 10 so as to be substancially perpendicular to the transmission tunnel. As well shown in FIG. 5, each of the first and second elongated rigid members 32 and 34 is a channel member having a pair of side walls 32a (34a) and 32b (34b) and a head wall 32c (34c), the side walls respectively having at the foot portions thereof flanges (no numerals) securely connected to the surface of the vehicle floor panel 10 in a conventional manner such as welding. The inward end of the first elongated rigid member 32 is securely connected to the side wall portion 30a of the transmission tunnel 30. The second elongated rigid member 34 has a middle portion formed with an opening 36 covering the transmission tunnel 30. Although not shown, the outward ends of the first and second elongated rigid members 32 and 34 are securely connected to the associated side panels of the vehicle in a conventional manner.

One of the side walls of each elongated rigid member is formed with a pair of Inverted U-shaped openings 38 at the generally lower portion thereof. Each of the openings 38 is formed about a lug portion 40, the upper portion of which is bent inwardly toward the other side wall so as to form a generally L-shape as well seen in FIG. 5.

Pivotally fitted on the back surface, at the edge portion, of the vehicle floor trimming 12 is a generally U-shaped wiry member 42 which is engageable with the associated lug portion 40 via the bent portion 40a. This member may be formed of wire or sheet steel as desired. As shown, the generally U-shaped member 42 is so formed as to have, at the foot portions thereof, a pair of supported portions 42a which are rotatably fitted onto the back surface of the floor trimming 12 by means of a suitable fastener 44. Further, the generally middle portions 42b of the leg portions of the member 42 are inwardly curved for preventing incidental disengagement of the member 42 from the lug portion 40 of the elongated rigid member 32.

Although in this embodiment, the member 42 is arranged on the back surface of the floor trimming 12, it is also possible to arrange the member 42 within the floor trimming 12 so long as the member 42 is not projected from the upper side of the floor trimming 12.

It will be understood that the invention is not to be limited to the exact construction shown and described and that various changes and modifications may be made without departing from the spirit and scope of the invention, as defined in the appended claims.

What is claimed is:

1. An arrangement for fastening a floor trimming to a vehicle floor panel comprising:
   an elongated rigid member formed into a channel member with a pair of said walls and a head wall, said side walls being foot portions generally opposite to said head wall, said elongated rigid member being firmly connected at said foot portions to said vehicle floor panel, one of said side walls being formed with an inverted U-shaped opening, said one side wall having a lug portion which is surrounded by said inverted U-shaped opening; and a hook member fastened to an edge portion of said floor trimming and hookable on said lug portion.

2. An arrangement as claimed in claim 1, in which said lug portion has an upper portion which is bent inwardly toward the other side wall.

3. An arrangement as claimed in claim 1, in which said hook member includes a generally U-shaped member, said U-shaped member having a pair of leg portions, said leg portions having support portions which are rotatably supported on the back surface of said floor trimming by means of a fastener.

4. An arrangement as claimed in claim 1, in which said elongated rigid member is provided at said foot portions of said side walls with outwardly extending flange portions firmly secured onto said vehicle floor panel.

5. An arrangement as claimed in claim 3, in which said leg portions of said U-shaped member have middle sections, said middle sections having an arcuate configuration.

* * * * *

UNITED STATES PATENT AND TRADEMARK OFFICE
CERTIFICATE OF CORRECTION

PATENT NO. : 4,033,011
DATED : July 5, 1977
INVENTOR(S) : Toshiaki ENDO and Toshiro HATTA It is certified that error appears in the above-identified patent and that said Letters Patent are hereby corrected as shown below:

In the heading of the Patent under "Foreign Application Priority Data", change "49-501800" to --50-1800--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*